(No Model.)
G. LAUBE.
VEHICLE WHEEL.
No. 543,311. Patented July 23, 1895.
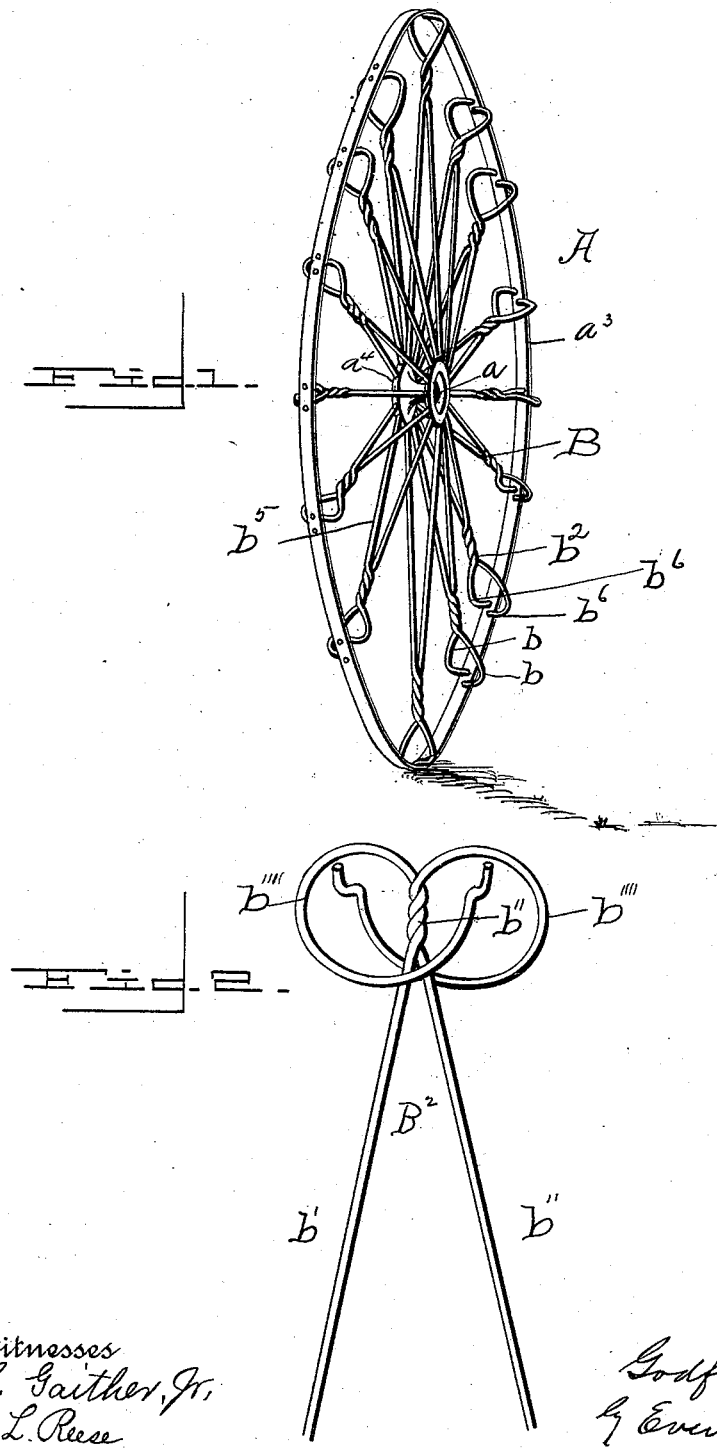
Witnesses
J. C. Gaither, Jr.
C. L. Reese
Inventor
Godfried Laube
by Evert & Appleman
Attorneys

UNITED STATES PATENT OFFICE.

GODFRIED LAUBE, OF HURON, SOUTH DAKOTA, ASSIGNOR OF ONE-HALF TO JOSEPH HYMANS, OF DEL RIO, TEXAS.

VEHICLE-WHEEL.

SPECIFICATION forming part of Letters Patent No. 543,311, dated July 23, 1895.

Application filed March 24, 1894. Serial No. 504,913. (No model.)

*To all whom it may concern:*

Be it known that I, GODFRIED LAUBE, a citizen of the United States of America, residing at Huron, in the county of Beadle and State of South Dakota, have invented certain new and useful Improvements in Vehicle-Wheels, of which the following is a specification, reference being had to the accompanying drawings.

This invention relates to certain new and useful improvements in wheels, and particularly to that class employed in children's carriages.

Heretofore it has been customary to employ a double-felly wheel on vehicles of the class aforesaid for the purpose of broadening the tread thereof sufficiently to prevent the wheels falling into cracks between boards of board walks, such as are common in the suburbs or rural districts.

This invention contemplates the provision of a novel form of spoke to be used with a single-felly wheel and of such peculiar construction as to possess all the advantages of a double-felly wheel.

A further object is to employ a simple and inexpensive construction that shall prove strong, durable, and thoroughly efficient in use.

With these and other objects in view various combinations and arrangements are employed, which will be hereinafter more fully set forth, and specifically pointed out in the annexed claim.

In describing the invention in detail reference is had to the accompanying drawings, forming part of the specification, wherein similar letters of reference indicate corresponding parts in both views, in which—

Figure 1 is a view in perspective showing a wheel provided with my improved spoke. Fig. 2 is a similar view of a modified form of spoke.

In the drawings, A denotes a common form of metallic wheel, $a$ the hub, and B the spokes. Each spoke is formed of duplicate wires $b\ b$, which are twisted together at $b^2$, with the extremities diverging. These diverging extremities near the felly are bent inwardly substantially at right angles to the length of the spoke proper, with the terminals thereof turned up to engage suitably-formed apertures of the felly or tire $a^3$. The inner portions $b^5$ of the wires preferably diverge for attachment to the hub-disks $a^4\ a^4$, which may be effected in any well-known manner.

From the foregoing it will be obvious that by reason of the projecting portions $b^6\ b^6$ of each spoke the tread may be broadened to any desired extent and without materially increasing the cost of manufacture or presenting an awkward or ungainly appearance.

Referring to Fig. 2, wherein a slightly-modified form of spoke is illustrated, $B^2$ denotes the spoke proper, which is formed, as in the first instance, of duplicate wires $b'\ b'$, twisted together at $b''$, and with the lower extremities diverging and adapted for attachment to the hub, as above described. The upper extremities $b''''\ b''''$, however, are bent outwardly in opposite directions, then downwardly, and given an approximately semicircular form, with the terminals, when secured to the felly or tire, in practically perfect alignment with the twisted portion, as indicated by dotted lines. Thus it will be observed that by a slight change from the form shown in Fig. 1 the portions or guards projecting at each side of the felly are given a certain amount of elasticity and are capable of absorbing slight shocks without transmitting the jar to the vehicle-body.

It will be understood that I do not wish to confine myself to the exact construction herein shown and described, as various detail changes may be made without necessarily departing from the meaning of the present invention.

Having fully described my invention, what I claim as new, and desire to secure by Letters Patent, is—

A vehicle wheel having spokes composed of duplicate wires twisted together with diverging extremities, which are bent inwardly near the felly to form shoulders, substantially as described.

In testimony whereof I affix my signature in presence of two witnesses.

GODFRIED LAUBE.

Witnesses:
 ANNIE T. LAUBE,
 HATTIE ROSE LAUBE.